United States Patent
Cai et al.

(10) Patent No.: US 9,014,730 B2
(45) Date of Patent: Apr. 21, 2015

(54) DEVICE REACHABILITY IN LTE NETWORKS FOR TEXT MESSAGING

(75) Inventors: Yigang Cai, Naperville, IL (US); Shaumir Shah, Aurora, IL (US); Gyan Shanker, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/536,649

(22) Filed: Jun. 28, 2012

(65) Prior Publication Data

US 2014/0004890 A1 Jan. 2, 2014

(51) Int. Cl.
| | |
|---|---|
| H04W 4/00 | (2009.01) |
| H04L 29/08 | (2006.01) |
| H04W 4/12 | (2009.01) |
| H04L 12/58 | (2006.01) |

(52) U.S. Cl.
CPC ............... *H04L 67/24* (2013.01); *H04W 4/12* (2013.01); *H04L 51/30* (2013.01); *H04L 51/38* (2013.01)

(58) Field of Classification Search
CPC .. H04W 36/0022; H04W 76/022; H04W 4/14
USPC ................ 455/466, 433, 412.1; 370/229, 231
See application file for complete search history.

(56) References Cited

U.S. PATENT DOCUMENTS

| | | | | |
|---|---|---|---|---|
| 2010/0261490 | A1* | 10/2010 | Berry et al. | 455/466 |
| 2011/0021216 | A1* | 1/2011 | Pudney et al. | 455/466 |
| 2011/0098063 | A1* | 4/2011 | Richardson | 455/466 |

OTHER PUBLICATIONS

3rdGeneration Partnership Project; Technical Specification Group Services and System Aspects; System Improvements for Machine-Type Communications; (Release 11) 3GPP TR 23.888 V1.3.0 (Jun. 2011) 650 Route des Lucioles—Sophia Antipolis Valbonne—France.
3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 9) 3GPP TS 29.272 V9.0.0 (Sep. 2009)650 Route des Lucioles—Sophia Antipolis Valbonne—France.
3rd Generation Partnership Project; Technical Specification Group Core Network and Terminals; InterWorking Function (IWF) between MAP based and Diameter based interfaces (Release 9) 3GPP TS 29.305 V9.0.0 (Dec. 2009) 650 Route des Lucioles—Sophia Antipolis Valbonne—France.

* cited by examiner

*Primary Examiner* — Christopher M Brandt
*Assistant Examiner* — Joseph Dean, Jr.
(74) *Attorney, Agent, or Firm* — Duft Bornsen & Fettig, LLP

(57) ABSTRACT

Systems and methods for determining the availability or reachability of mobile devices to receive text messages. One embodiment comprises a message entity of a Long Term Evolution (LTE) network. The message entity attempts delivery of a text message to a mobile device, and determines that the delivery attempt failed due to the mobile device being temporarily unavailable. The message entity transmits a request to a Mobility Management Entity (MME) of the LTE network to be notified when the mobile device becomes available. The message entity receives a notification from the MME that the mobile device is available, and retries delivery of the text message to the mobile device responsive to the notification from the MME that the mobile device is available.

10 Claims, 5 Drawing Sheets

DEVICE REACHABILITY IN LTE NETWORKS FOR TEXT MESSAGING

FIELD OF THE INVENTION

The invention is related to the field of communications and, in particular, to text messaging in Long Term Evolution (LTE) networks.

BACKGROUND

Service providers offer numerous voice and/or data services to their subscribers over a telecommunication (telecom) network. One of the more popular types of telecom-type communications is text messaging. Text messaging allows end users to exchange short messages between mobile devices and between fixed-line devices that are text-enabled. Text messaging is controlled by a protocol, such as Short Message Service (SMS). SMS is a set of communication protocols allowing the exchange of short text messages (i.e., 160 characters or less) between devices. While the term "text message" traditionally referred to text-only messages sent using SMS, it has been extended to include multimedia messages that include content such as images, video, sound, etc. The multimedia messages may be sent using Multimedia Message Service (MMS) protocol.

There are a variety of types of networks that are able to provide voice and data communications for mobile users. The 3rd Generation Partnership Project (3GPP, 3GPP2) sets forth specifications defining standards for communicating over these networks. One project within the 3GPP is the Long Term Evolution (LTE) which is a project to improve the Universal Mobile Telecommunication System (UMTS) mobile phone standard to cope with future requirements. The architecture defined by this project is referred to as the Evolved Packet System (EPS). The EPS architecture comprehends E-UTRAN (Evolved UTRAN) on the access side and EPC (Evolved Packet Core) on the core side.

At this time, text messaging over an LTE network has not been adequately defined.

SUMMARY

Embodiments described herein provide a new solution for determining the reachability (or availability) of mobile devices to receive text messages over an LTE network. When a message entity attempts to deliver a text message to a mobile device of the LTE network and the delivery attempt fails (e.g., the mobile device is temporarily unavailable), the message entity is able to directly query a Mobility Management Entity (MME) of the LTE network to be informed of the availability of the mobile device. When the mobile device becomes available, the MME sends a notification directly to the message entity, and the message entity is able to retry delivery of the text message to the mobile device when it is available. By having the message entity directly communicate with the MME as described herein, the LTE network operates more efficiently to deliver text messages.

One embodiment comprises a message entity of an LTE network. The message entity is configured to attempt delivery of a text message to a mobile device, and to determine that the delivery attempt failed due to the mobile device being temporarily unavailable. The message entity is further configured to transmit a request to an MME of the LTE network to be notified when the mobile device becomes available. The message entity is further configured to receive a notification from the MME that the mobile device is available, and to retry delivery of the text message to the mobile device responsive to the notification from the MME that the mobile device is available.

In another embodiment, the message entity is further configured to transmit the request to the MME and receive the notification from the MME over a Diameter S6 interface.

In another embodiment, the request sent to the MME to be notified when the mobile device becomes available comprises a Diameter Insert-Subscriber-Data-Request (IDR).

In another embodiment, the notification from the MME to the message entity comprises a Diameter Notify-Request (NOR).

In another embodiment, the MME is configured to receive the text message from the message entity through a native Short Message Service (SMS) protocol, such as SMPP or Diameter.

In another embodiment, the message entity may comprise an Internet Protocol Short Message Gateway (IP-SM-GW), a Short Message Service Interworking Function (SMS IWF), a Short Message Service Center (SMSC), a Short Message Service Gateway (SMS GW), etc.

Another embodiment comprises a method of determining the reachability of a mobile device. The method includes attempting delivery of a text message from a message entity of an LTE network to a mobile device, and determining that the delivery attempt failed due to the mobile device being temporarily unavailable. The method further includes transmitting a request from the message entity to an MME of the LTE network to be notified when the mobile device becomes available. The method further includes receiving a notification in the message entity from the MME that the mobile device is available, and retrying delivery of the text message to the mobile device responsive to the notification from the MME that the mobile device is available.

Another embodiment comprises an MME of an LTE network that is configured to serve a mobile device. The MME is further configured to receive from a message entity a text message that is intended for the mobile device, to attempt delivery of the text message to the mobile device, and to send a response to the message entity indicating that the delivery attempt failed due to the mobile device being temporarily unavailable. The MME is further configured to receive a request from the message entity to be notified when the mobile device becomes available, and to monitor a status of the mobile device. When the mobile device becomes available, the MME is further configured to transmit a notification to the message entity that the mobile device is available to initiate a delivery retry.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
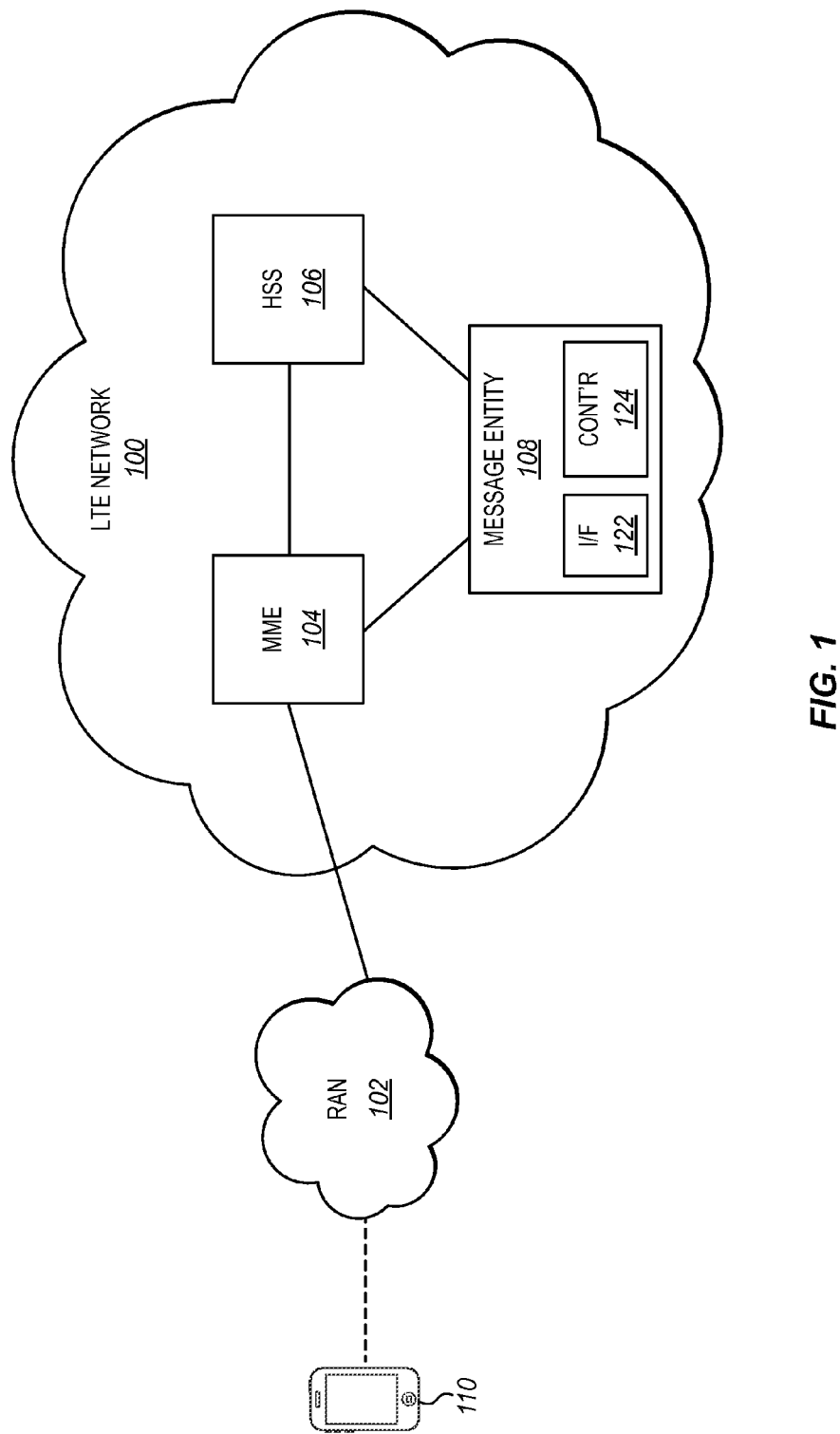
FIG. 1 illustrates a Long Term Evolution (LTE) network in an exemplary embodiment.

FIG. 1 illustrates a Long Term Evolution (LTE) network 100 in an exemplary embodiment. LTE network 100 serves as a home network for a mobile device 110 and is able to provide services to mobile device 110, such as text messaging. In this embodiment, LTE network 100 includes a Radio Access Network (RAN) 102, a Mobility Management Entity (MME) 104, and a Home Subscriber Server (HSS) 106. RAN 102 comprises any radio or wireless network that interfaces a mobile device with the core LTE network. Examples of RAN 102 include an Evolved UTRAN (E-UTRAN). MME 104 comprises any switch, server, or other node in LTE network 110 that handles tracking and paging procedures for mobile device 110 and other mobile devices. MME 104 is also able to communicate with mobile device 110 using Non Access Stratum (NAS) signaling, which can be used for exchanging text messages with mobile device 110. HSS 106 comprises any database or similar system that stores and maintains subscriber information or a subscriber profile for one or more mobile subscribers. For instance, HSS 106 may maintain a subscriber profile for a user of mobile device 110 that indicates one or more statuses for a mobile subscriber, such as whether or not mobile device 110 is registered with LTE network 100, where mobile device 110 is located within the network, whether mobile device 110 is roaming, etc.

LTE network 100 may include other network elements that are not shown in FIG. 1, such as a Serving Gateway (SGW), a Packet Data Network Gateway (PGW), a Policy Charging and Rules Function (PCRF), or other elements.

In order to implement text messaging, LTE network 100 also includes a message entity 108. Message entity 108 comprises any system, server, or node operable to handle text messages within LTE network 100. When a Mobile Terminated (MT) text message is destined for mobile device 110, the MT text message is typically delivered by message entity 108. When a Mobile Originated (MO) message is initiated within mobile device 110, the MO text message is received and handled by message entity 108. Message entity 108 may include First Delivery Attempt (FDA) functionality and/or store-and-forward (SNF) functionality to attempt delivery of text messages to their destinations. Some examples of message entity 108 are an Internet Protocol Short Message Gateway (IP-SM-GW), a Short Message Service Interworking Function (SMS IWF), a Short Message Service Center (SMSC), a Short Message Service Gateway (SMS GW), or another type of message center.

In this embodiment, message entity 108 includes an interface 122 and a controller 124. Interface 122 comprises any device, component, or system that is able to send and receive text messages according to a signaling protocol. For example, the signaling protocol may comprise a native SMS protocol, such as Diameter or Short Message Peer-to-Peer (SMPP). The signaling protocol may also comprise Mobile Application Part (MAP) protocol, Session Initiation Protocol (SIP), etc. Interface 122 is also able to communicate with MME 104 to be notified when mobile device 110 is reachable. The interface used for notification may be the Diameter S6 interface or another type of interface. Controller 124 comprises any device, component or system that controls the operation of message entity 108 to handle delivery of text messages.

When message entity 108 attempts to deliver MT text messages to mobile device 110, there may be situations where mobile device 110 is temporarily unavailable to receive the text messages. When mobile device 110 is temporarily unavailable, this means that mobile device 110 is indicated as registered with LTE network 100, and a subscriber profile (or subscriber data) remains unchanged in HSS 106. Even though mobile device 110 is registered, it is not able to receive or process a text message for a (e.g., brief) time period. For example, mobile device 110 may be temporarily out of the service area of RAN 102 (e.g., in a tunnel, in a building, etc.). When mobile device 110 is temporarily unavailable, delivery of the text messages will fail.

In the following embodiments, message entity 108 is enhanced to more effectively handle failed delivery attempts when mobile device 110 is temporarily unavailable. After one or more failed delivery attempts, message entity 108 is able to communicate directly with MME 104 to determine the availability or "reachability" of mobile device 110. MME 104 informs message entity 108 when mobile device 110 becomes available so that it may retry delivery of the text messages that previously failed. In prior LTE networks, message entity 108 would query HSS 106 to determine the availability of mobile device 110. This process was inefficient and increased the number of signaling messages that are exchanged within the LTE network. Instead of querying HSS 106, message entity 108 is able to query MME 104 directly to determine the availability of mobile device 110. A further description of the communications between MME 104 and message entity 108 is described in FIGS. 2-3.

Figure 2:
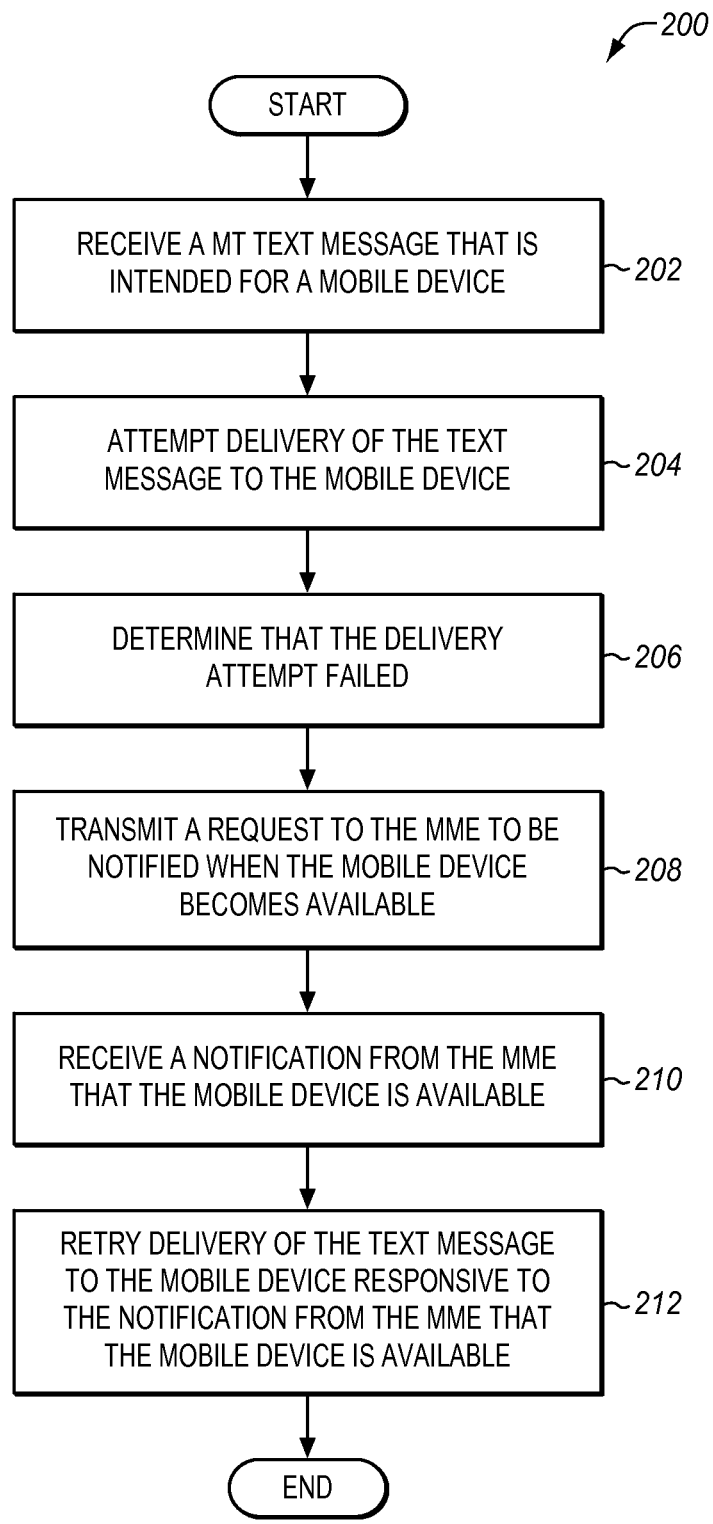
FIG. 2 is a flow chart illustrating a method of handling a text message in a message entity in an exemplary embodiment.

FIG. 2 is a flow chart illustrating a method 200 of handling a text message in a message entity in an exemplary embodiment. The steps of method 200 will be described with reference to message entity 108 of LTE network 100 in FIG. 1, but those skilled in the art will appreciate that method 200 may be performed in other message entities and in other networks. The steps of the flow charts described herein are not all inclusive and may include other steps not shown. The steps may also be performed in an alternative order.

In step 202, message entity 108 receives a MT text message that is intended for mobile device 110. In step 204, message entity 108 attempts delivery of the text message to mobile device 110. To attempt delivery of the text message, message entity 108 may send the text message to MME 104, which is further illustrated in FIG. 3. Message entity 108 may send the text message to MME 104 via any available protocol, such as through a native SMS protocol (e.g., Diameter or SMPP) or another protocol (e.g., SIP or MAP).

Figure 3:
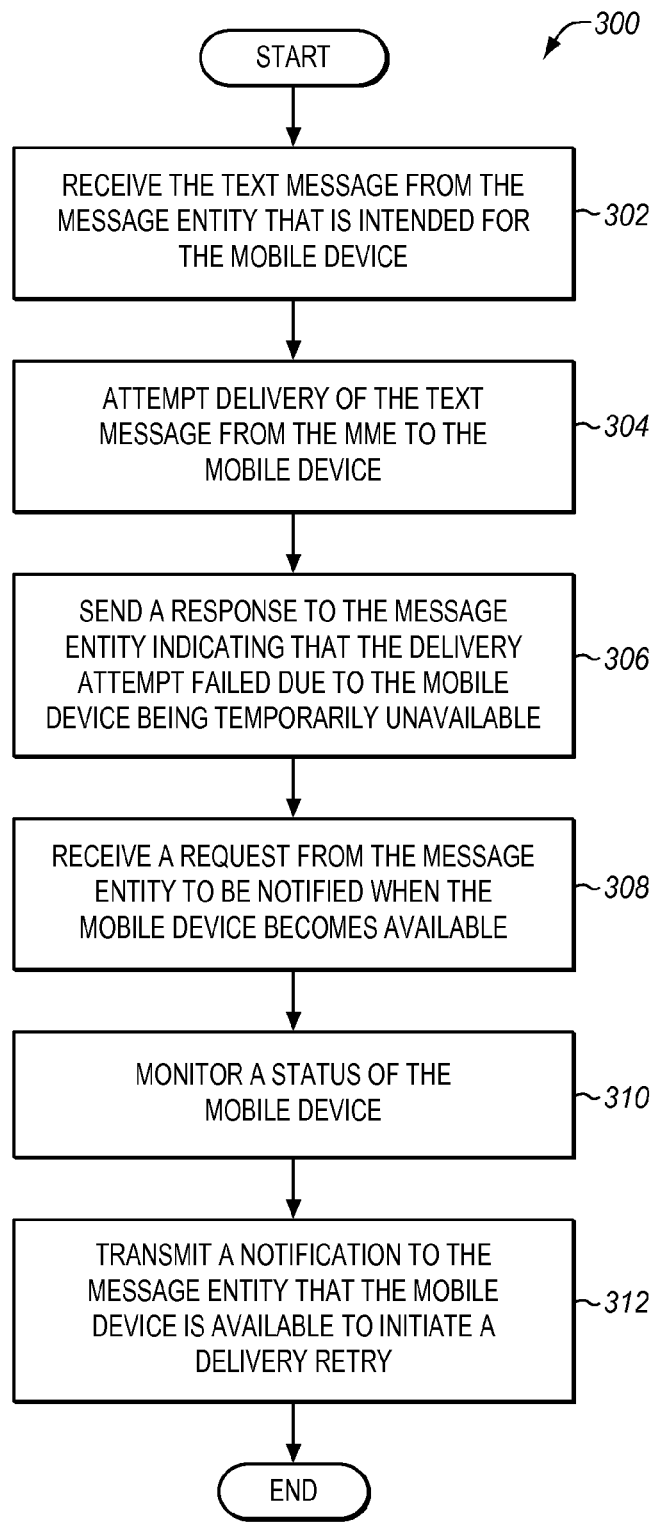
FIG. 3 is a flow chart illustrating a method of handling a text message in an MME in an exemplary embodiment.

FIG. 3 is a flow chart illustrating a method 300 of handling a text message in an MME in an exemplary embodiment. The steps of method 300 will be described with reference to MME 104 in FIG. 1, but those skilled in the art will appreciate that method 300 may be performed in other network elements in other networks and in other systems.

In step 302, MME 104 receives the text message from message entity 108 that is intended for mobile device 110. In step 304, MME 104 attempts delivery of the text message to mobile device 110. For example, MME 104 may attempt delivery of the text message to mobile device 110 over Non-Access Stratum (NAS) signaling. Because mobile device 110 is temporarily unavailable in this embodiment, the delivery attempt will fail. Therefore, MME 104 sends a response to message entity 108 that the delivery attempt failed due to mobile device 110 being temporarily unavailable in step 306. The response from MME 104 may include an error code or cause code indicating why the delivery attempt failed.

In step 206 of FIG. 2, message entity 108 determines that the delivery attempt failed based on the response from MME 104. In response to the failed delivery attempt, message entity 108 transmits a request to MME 104 to be notified when mobile device 110 becomes available in step 208. In one particular embodiment, message entity 108 connects with MME 104 over a Diameter S6 interface. Message entity 108 may request availability information for mobile device 110 by transmitting a Diameter Insert-Subscriber-Data-Request (IDR) to MME 104 over the Diameter S6 interface. Message entity 108 may transmit other types of requests to MME 104 in other embodiments. After sending the request to MME 104, message entity 108 waits for a response from MME 104.

In step 308 of FIG. 3, MME 104 receives the request from message entity 108 to be notified when mobile device 110 becomes available. In step 310, MME 104 monitors the status of mobile device 110. Because mobile device 110 is still registered with LTE network 100, MME 104 monitors for any indication that mobile device 110 is still attached to LTE network 100. For example, MME 104 may identify that mobile device 110 responded to a page. MME 104 may identify that mobile device 110 has attempted to initiate a voice call, send a text message, or perform some other type of communication. MME 104 may also identify that mobile device 110 sent a re-register request to HSS 106. In any event, MME 104 is able to determine or identify that mobile device 110 is available or reachable for text message delivery. When mobile device 110 becomes available, MME 104 transmits a notification to message entity 108 that mobile device 110 is available in step 312.

In the embodiment where message entity 108 connects with MME 104 over a Diameter S6 interface, MME 104 may transmit the notification to message entity 108 in a Diameter Notify-Request (NOR). MME 104 may transmit other types of notifications to message entity 108 in other embodiments.

In FIG. 2, message entity 108 receives the notification from MME 104 in step 210. In response to the notification that mobile device 110 is now available, message entity 108 retries delivery of the text message to mobile device 110 in step 212. Because mobile device 110 is available at this time, the retry attempt should be successful to mobile device 110. Message entity 108 may attempt a retry for each text message having a failed delivery during the time that mobile device 110 was temporarily unavailable.

If the retry attempt is not successful due to mobile device 110 being temporarily unavailable (again), then the above process repeats.

Because message entity 108 is able to directly contact MME 104 to determine the reachability of mobile device 110, retry delivery is handled more efficiently in LTE network 100. Message entity 108 does not need to contact HSS 106 or any other network elements to be informed of the availability of mobile device 110. MME 104 will be able to determine when mobile device 110 is reachable, so it is advantageous to have message entity 108 contact MME 104 directly regarding the availability of mobile device 110.

Example

Figure 4:
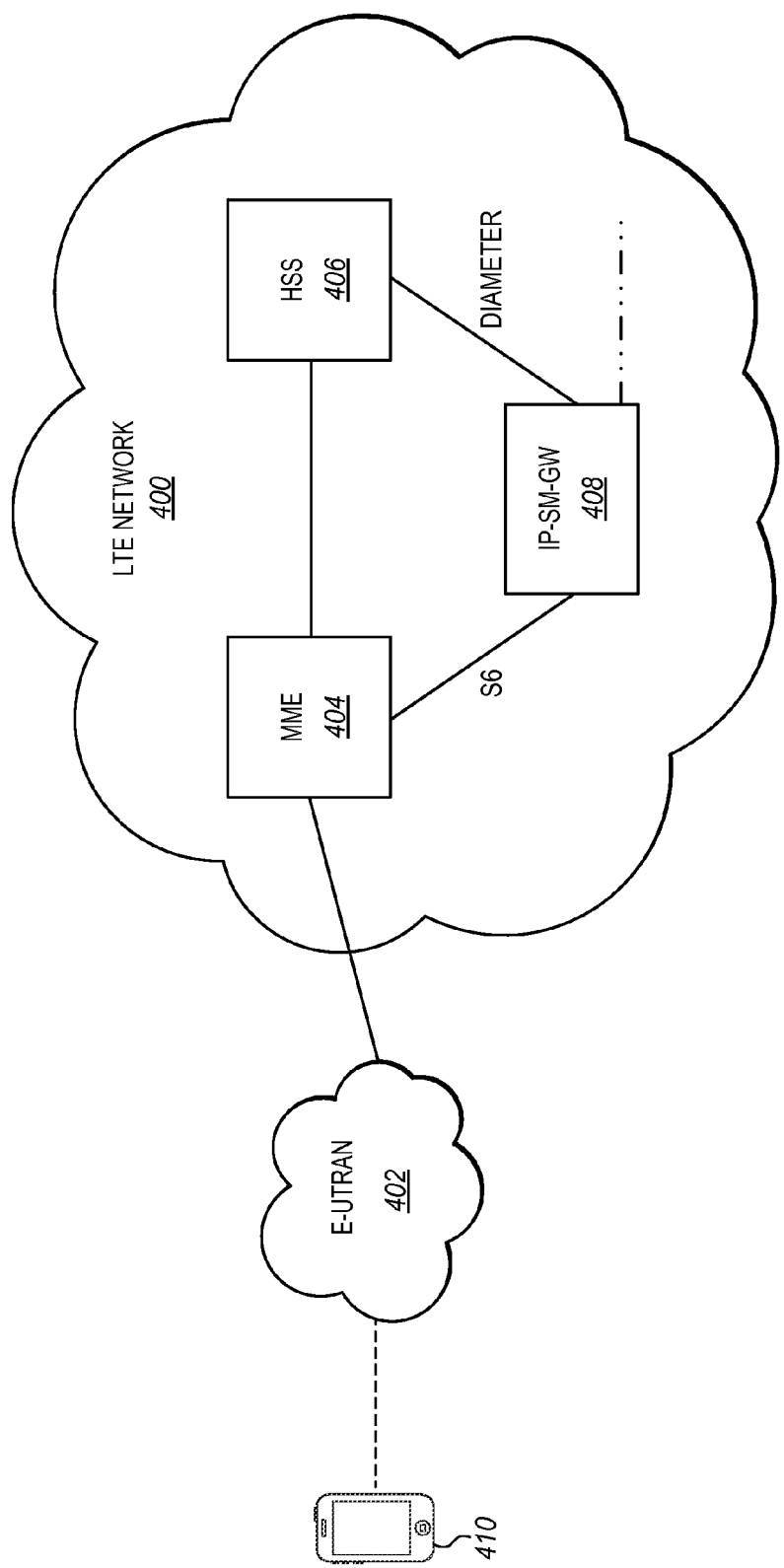
FIG. 4 illustrates an LTE network in another exemplary embodiment.

FIG. 4 illustrates an LTE network 400 in another exemplary embodiment. LTE network 400 serves as a home network for User Equipment (UE) 410. In this embodiment, LTE network 400 includes an E-UTRAN 402, an MME 404, an HSS 406, and an IP-SM-GW 408. IP-SM-GW 408 is able to exchange text messages with other SMS service layer elements, such as an SMSC, an SMS router, etc. Therefore, IP-SM-GW 408 may be considered a "message entity" as described in the above embodiments. IP-SM-GW 408 connects to HSS 406 over a Diameter interface, and connects to MME 404 over a Diameter S6 interface.

Figure 5:
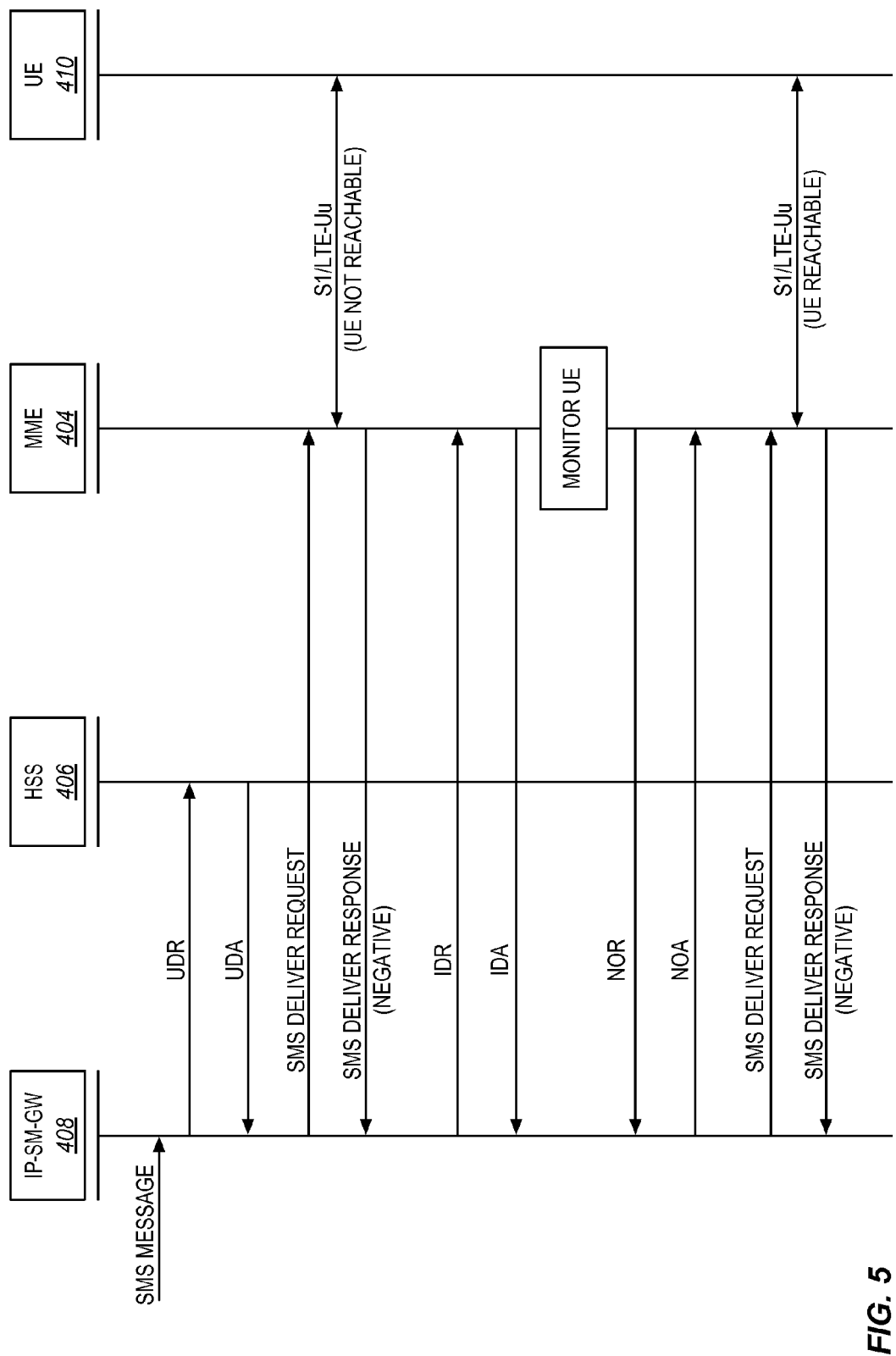
FIG. 5 is a message diagram that illustrates SMS message delivery in an exemplary embodiment.

FIG. 5 is a message diagram that illustrates SMS message delivery in an exemplary embodiment. IP-SM-GW 408 receives an SMS message that is intended for UE 410. In order to deliver the SMS message, IP-SM-GW 408 queries HSS 406 for routing information for the SMS message. Thus, IP-SM-GW 408 sends a Diameter User-Data-Request (UDR) to HSS 406 requesting the routing information, and HSS 406 replies with a Diameter User-Data-Answer (UDA) that includes the routing information. Using the routing information, IP-SM-GW 408 sends the SMS message to MME 404 via any available protocol, such as SIP, MAP, SMPP, or Diameter. MME 404 then attempts to deliver the SMS message to UE 410 using Non-Access Stratum (NAS) signaling.

The assumption here is that UE 410 is temporarily unavailable, but that there are no subscriber data changes at the subscriber profile stored in HSS 406. In other words, the HSS subscriber profile for UE 410 indicates that the UE is registered and should be available. Because UE 410 is temporarily unavailable, the delivery attempt of the SMS message to UE 410 will fail. Therefore, MME 404 sends a response to IP-SM-GW 408 indicating that the delivery attempt failed. Responsive to the notification that delivery failed, IP-SM-GW 408 sends a Diameter Insert-Subscriber-Data-Request (IDR) to MME 404 requesting to be notified when UE 410 becomes available. MME 404 responds back to IP-SM-GW 408 with a Diameter Insert-Subscriber-Data-Answer (IDA). MME 404 then monitors the status of UE 410 to determine if/when it becomes available.

When MME 404 identifies that UE 410 is available, MME 404 sends a Diameter Notify-Request (NOR) to IP-SM-GW 408 indicating that UE 410 is available. IP-SM-GW 408 responds back to MME 404 with a Diameter Notify-Answer (NOA). IP-SM-GW 408 then sends the SMS message to MME 404 via any available protocol. After receiving the SMS message, MME 404 attempts to deliver the SMS message to UE 410 using NAS signaling. Because UE 410 is available at this time, the SMS message will be successfully delivered to UE 410. Thus, MME 404 sends a response to IP-SM-GW 408 indicating that the delivery attempt was successful.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. An apparatus comprising:
   a Short Message Service Center (SMSC) that directly connects to a Mobility Management Entity (MME) over an interface in a Long Term Evolution (LTE) network;
   the SMSC is configured to attempt delivery of a text message to a mobile device, and to determine that the delivery attempt failed due to the mobile device being unavailable;
   wherein the SMSC is configured to transmit a request directly to the MME to be notified when the mobile device becomes available instead of querying a Home Subscriber Server (HSS); and
   wherein the SMSC is configured to receive a notification directly from the MME in response to the request that the mobile device is available, and to retry delivery of the text message to the mobile device responsive to the notification from the MME that the mobile device is available without any involvement of the HSS.

2. The apparatus of claim 1 wherein:
   the interface comprises a Diameter S6 interface.

3. The apparatus of claim 2 wherein:
   the request sent to the MME to be notified when the mobile device becomes available comprises a Diameter Insert-Subscriber-Data-Request (IDR).

4. The apparatus of claim 2 wherein:
   the notification from the MME to the SMSC comprises a Diameter Notify-Request (NOR).

5. The apparatus of claim 1 wherein:
   the SMSC is configured to attempt delivery of the text message to the mobile device by sending the text message to the MME using a native Short Message Service (SMS) protocol.

6. A method comprising:
   attempting delivery of a text message from a Short Message Service Center (SMSC) of a Long Term Evolution (LTE) network to a mobile device,
   determining that the delivery attempt failed due to the mobile device being unavailable;
   transmitting a request from the SMSC directly to a Mobility Management Entity (MME) of the LTE network to be notified when the mobile device becomes available instead of querying a Home Subscriber Server (HSS), wherein the SMSC connects to the MME over an interface in the LTE network;
   receiving a notification in the SMSC directly from the MME in response to the request that the mobile device is available; and
   retrying delivery of the text message to the mobile device responsive to the notification from the MME that the mobile device is available without any involvement of the HSS.

7. The method of claim 6 wherein:
   the interface comprises a Diameter S6 interface.

8. The method of claim 7 wherein:
   the request sent from the SMSC to the MME to be notified when the mobile device becomes available comprises a Diameter Insert-Subscriber-Data-Request (IDR).

9. The method of claim 7 wherein:
   the notification from the MME to the SMSC comprises a Diameter Notify-Request (NOR).

10. The method of claim 6 wherein attempting delivery of the text message comprises:
    attempting delivering of the text message from the SMSC to the MME using a native Short Message Service (SMS) protocol.

* * * * *